(12) United States Patent
Rice et al.

(10) Patent No.: US 6,229,940 B1
(45) Date of Patent: May 8, 2001

(54) INCOHERENT FIBER OPTIC LASER SYSTEM

(75) Inventors: Robert Rex Rice, Chesterfield; Mark Steven Zediker, Florissant; Jack Herbert Hollister, Chesterfield, all of MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/200,613

(22) Filed: Nov. 30, 1998

(51) Int. Cl.[7] .................... G02B 6/32; H01S 3/091; H01S 3/0915
(52) U.S. Cl. ............... 385/33; 385/31; 372/6; 257/98
(58) Field of Search ............... 385/31–35, 115–119, 385/88–90; 372/6; 257/98

(56) References Cited

U.S. PATENT DOCUMENTS

| | | |
|---|---|---|
| 4,933,949 | 6/1990 | Johnson . |
| 4,940,303 | 7/1990 | Abeles et al. . |
| 5,048,911 | 9/1991 | Sang et al. . |
| 5,121,400 | 6/1992 | Verdiell et al. . |
| 5,212,707 | 5/1993 | Heidel et al. . |
| 5,299,222 | 3/1994 | Shannon et al. . |
| 5,355,387 | 10/1994 | English, Jr. et al. . |
| 5,369,661 | 11/1994 | Yamaguchi et al. . |
| 5,373,526 | 12/1994 | Lam et al. . |
| 5,526,373 | 6/1996 | Karpinski . |
| 5,600,666 | 2/1997 | Hiiro . |
| 5,661,747 | 8/1997 | Hiiro . |
| 5,694,408 | 12/1997 | Bott et al. . |
| 5,715,270 | 2/1998 | Zediker et al. . |
| 5,777,342 | * 1/1999 | Baer ...................... 250/492.2 |
| 5,832,163 | 11/1998 | Hollister . |
| 5,862,278 | * 1/1999 | Brauch et al. ................. 385/34 |

\* cited by examiner

*Primary Examiner*—Rodney Bovernick
*Assistant Examiner*—Juliana K. Kang
(74) *Attorney, Agent, or Firm*—Alston & Bird LLP (57) ABSTRACT

An incoherent fiber optic laser system is provided which provides a high quality output beam which is readily scalable and which can be focused to a target location located relatively near or relatively far without requiring sophisticated optical elements. The incoherent fiber optic laser system includes a plurality of single mode laser sources, such as a plurality of fiber optic amplifiers, for providing single mode laser signals. The laser sources, such as the fiber optic amplifiers, operate incoherently with respect to one another such that the resulting laser signals are also incoherent. The incoherent fiber optic laser system also generally includes a plurality of single mode optical fibers for routing the incoherent laser signals as desired. In addition, the incoherent fiber optic laser system can include a plurality of lenses for collimating the incoherent laser signals provided by respective ones of the single mode optical fibers. In one advantageous embodiment, the incoherent fiber optic laser system also includes means for combining and focusing the collimated, incoherent laser signals to a target location at a predetermined distance. For example, the focusing means can focus the incoherent laser signals to a target location that is relatively near, such as within several inches, or to a target location that is relatively far, such as five or ten kilometers. Since the laser signals are incoherent, however, the fiber optic system need not include sophisticated optical elements, but can still produce a high quality output beam that is scalable to the wide range of power levels suitable for various applications.

21 Claims, 3 Drawing Sheets

INCOHERENT FIBER OPTIC LASER SYSTEM

FIELD OF THE INVENTION

The present invention relates generally to laser systems and, more particularly, to incoherent fiber optic laser systems.

BACKGROUND OF THE INVENTION

Lasers are presently employed for a wide variety of applications. For example, lasers are employed to process materials, such as by cutting, welding, heat treating, drilling, trimming and coating materials. Lasers are also employed to strip paint, remove coatings, clean surfaces and provide laser markings. Lasers can also be directly applied, such as via single mode optical fibers, for a variety of medical and other applications. Lasers are also increasingly employed in military applications, including laser weapon and laser ranging systems and sensor countermeasure systems. Laser communication systems have also been developed.

However, along with the ever-increasing number of applications in which lasers are used, the demands on the laser systems are also ever increasing. For example, a number of applications, including military and materials processing applications, are demanding lasers which emit increasingly higher power levels. In addition, a number of applications demand that the laser system produce an output beam which is of high quality, e.g., exhibiting predominantly or entirely fundamental or $TEM_{00}$ mode characteristics. By being of high quality, the output beam can be more definitely focused to achieve higher brightness. As a result of the wide variety of applications in which lasers are used, the output beam may be required to be focused relatively near, such as within a few inches or a few feet as typically required by industrial applications such as cutting, machining, welding, drilling, paint stripping, or relatively far, such as at a distance of several kilometers as typically required in military applications such as laser weapon and sensor countermeasure systems.

Many laser systems have been developed to service one or more of the foregoing applications. For example, some conventional laser systems are scalable to produce an output beam having different power levels. Typically, these conventional laser systems rely upon the combination of various coherent laser beams in order to produce a coherent output beam with a high power level. Since these conventional laser systems produce a coherent output beam, these laser systems typically require sophisticated optical elements in order to properly combine and/or focus the coherent laser beams. See, for example, U.S. Pat. No. 5,694,408 to Eric H. Bott, et al, which issued on Dec. 2, 1997 and is assigned to McDonnell Douglas Corporation, the contents of which are incorporated in their entirety herein. As will be apparent, the cost of these laser systems is therefore disadvantageously large, at least for some applications, as a result of the costly optical elements. In addition, other conventional laser systems fail to produce an output beam that is of high quality and, as a result, may have difficulty focusing or otherwise shaping the output beam. Still further, other conventional laser systems which do not produce a coherent output beam suffer from other disadvantages, such as being incapable of being readily scaled to produce a wide range of output power levels or requiring the laser sources to be immediately adjacent to one another which limits the options available to the system designer.

While a variety of laser systems have been developed to service specific ones of the foregoing and other applications, a need still exists for a laser system which can service a wide variety of applications, such as by providing an output beam that is scalable to different power levels and that can be focused to a target location that is either relatively near or relatively far. In addition, a need also exists for a laser system that produces an output beam having high quality that can be focused or otherwise controlled without requiring sophisticated optical elements that would significantly increase the cost of the laser system.

SUMMARY OF THE INVENTION

According to the present invention, an incoherent fiber optic laser system is provided which provides a high quality output beam which is readily scalable and which can be focused to a target location located relatively near or relatively far without requiring sophisticated optical elements. The incoherent fiber optic laser system includes a plurality of single mode laser sources, such as a plurality of fiber optic amplifiers, for providing single mode laser signals. According to the present invention, the laser sources, such as the fiber optic amplifiers, operate incoherently with respect to one another such that the resulting laser signals are also incoherent. The incoherent fiber optic laser system also generally includes a plurality of single mode optical fibers for routing the incoherent laser signals as desired. In addition, the incoherent fiber optic laser system can include a plurality of lenses for collimating the incoherent laser signals provided by respective ones of the single mode optical fibers. In one advantageous embodiment, the incoherent fiber optic laser system also includes means for combining and focusing the collimated, incoherent laser signals to a target location at a predetermined distance. According to the present invention, the focusing means can focus the incoherent laser signals to a target location that is relatively near, such as within several inches, or to a target location that is relatively far, such as five or ten kilometers. Since the laser signals are incoherent, however, the fiber optic system need not include sophisticated optical elements, but can still produce a high quality output beam that is scalable to the wide range of power levels suitable for various applications.

Typically, the focusing means includes a focusing lens. However, the focusing means can include means for laterally positioning the single mode optical fibers with respect to the lens axis of the respective collimating lens. By appropriately positioning the optical fibers with respect to the respective lenses, the incoherent laser signals can be effectively steered, and, as a result, can be controllably focused at the target location, either with or without the assistance of a focusing lens.

In one advantageous embodiment, the plurality of single mode laser sources are a plurality of fiber optic amplifiers that are pumped by the pump signals emitted by respective ones of a plurality of pump sources. Alternatively, the plurality of single mode laser sources can include a plurality of single mode diode lasers. In other instances, the incoherent fiber optic laser system can operate in a pulsed mode, if so desired, in which the plurality of single mode laser sources are a plurality of pulsed laser sources which emit single mode laser pulses. Advantageously, the pulsed laser sources are synchronized such that the resulting laser pulses can deliver high power at the high pulse rates that are believed to be required of the laser sources for the next generation of x-ray lithography equipment.

In order to increase the power of the laser signals, the plurality of single mode laser sources can include a plurality of pairs of single mode laser sources with each pair of laser sources including first and second single mode laser sources. In this embodiment, the incoherent fiber optic laser system can also include a plurality of couplers. As such, each coupler can combine the single mode laser signals provided by the first and second laser sources of a respective pair of single mode laser sources in order to produce a laser signal having more power than the laser signals provided by either the first or second single mode laser sources taken individually.

By utilizing incoherent laser signals, the fiber optic laser system of the present invention can generate a scalable output beam having relatively high power levels that can be focused to a target location at a predetermined distance without requiring sophisticated and therefore expensive optical elements. In particular, the collimated, incoherent laser signals are typically focused such that the laser signals are overlaid, thereby delivering significant power to the target location without requiring the sophisticated optics required to focus or otherwise combine coherent laser signals. However, the output beam produced by the incoherent fiber optic laser system of the present invention is of high quality, that is, the output beam exhibits predominantly or entirely fundamental or single mode characteristics. As such, the output beam generated by the incoherent fiber optic laser system of the present invention can be more definitively focused at near locations, such as within a few inches or a few feet, or far locations, such as at five or ten kilometers, in order to service a wide variety of laser applications. Moreover, by utilizing fiber optic amplifiers and/or optical fibers to provide and deliver the single mode optical signals, the laser sources can be spaced apart or otherwise positioned as desired, thereby increasing the flexibility of the incoherent fiber optic laser system of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
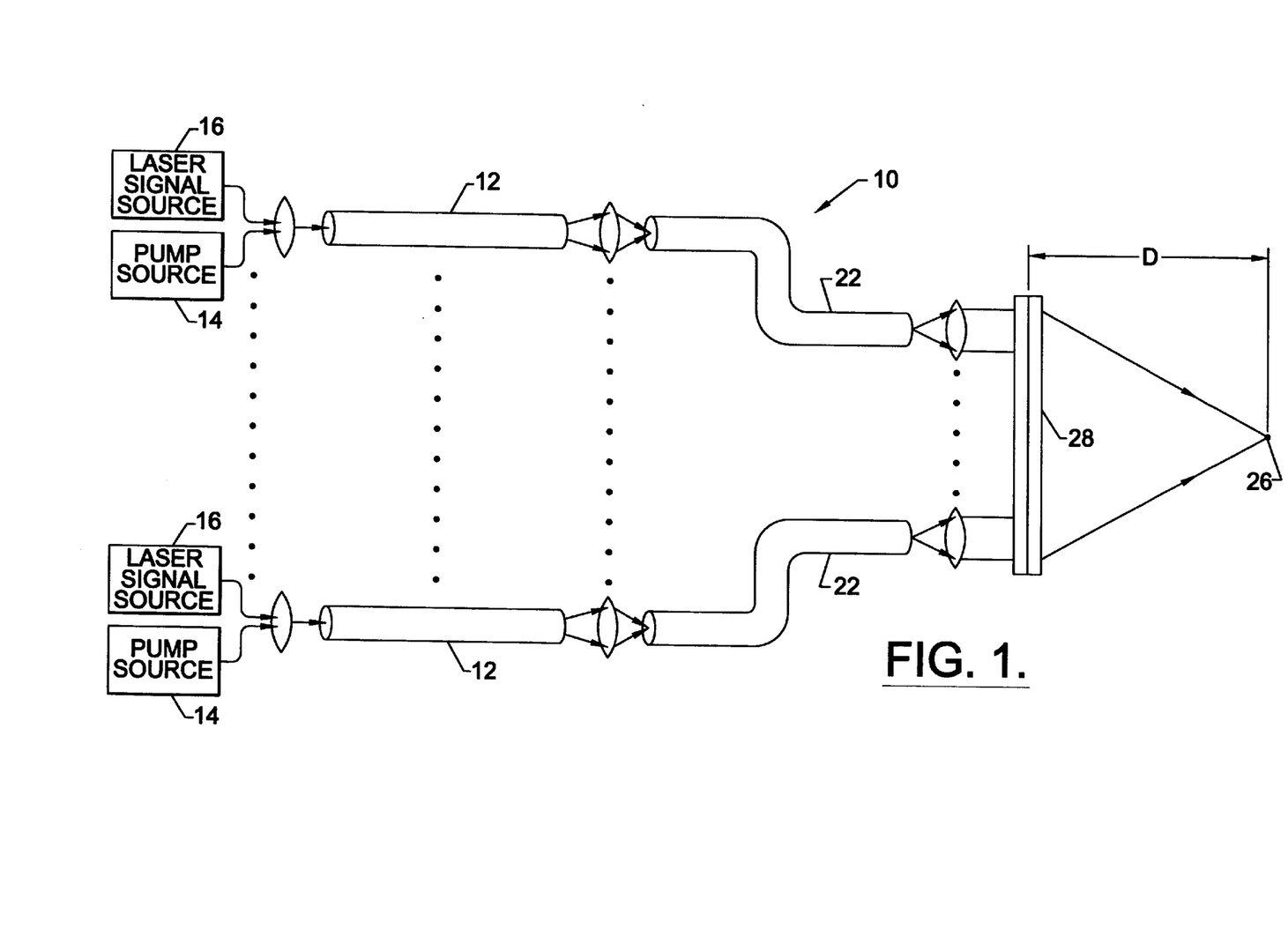
FIG. 1 is a diagram of the incoherent fiber optic laser system of one embodiment of the present invention.

Referring now to FIG. 1, an incoherent fiber optic laser system 10 according to one embodiment of the present invention is illustrated. The incoherent fiber optic laser system includes a plurality of laser sources for emitting laser signals. Preferably, the plurality of laser sources emit laser signals which are of high quality, that is, which exhibit predominantly or entirely fundamental $TEM_{00}$ mode characteristics. In this regard, the plurality of laser sources preferably emit single mode laser signals. According to the present invention, however, the plurality of laser sources operate incoherently with respect to one another such that the laser signals are also incoherent.

As shown in FIG. 1, a plurality of laser sources of one advantageous embodiment include a plurality of fiber optic amplifiers 12 and a plurality of pump sources 14 for emitting pump signals that pump respective ones of the fiber optic amplifiers. Typically, each pump source is an array of laser diodes, such as the laser diode array described by U.S. Pat. No. 5,212,707 which issued May 18, 1993 to Jeffery Heidel et al. and is assigned to McDonnell Douglas Corporation, the contents of which are incorporated in their entirety herein. Alternatively, the pump sources can be a plurality of fiber-coupled arrays, fiber-coupled single emitter devices or other pump sources known to those skilled in the art. See, for example, U.S. Pat. No. 5,715,270 which issued Feb. 3, 1998 to Mark S. Zediker et al. and is assigned to McDonnell Douglas Corporation, the contents of which are incorporated in their entirety herein. See also U.S. Pat. No. 5,369,661 which issued Nov. 29, 1994 to Satoshi Yamaguchi et al., U.S. Pat. No. 5,299,222 which issued Mar. 29, 1994 to David Shannon et al. and U.S. Pat. No. 5,048,911 which issued Sep. 17, 1991 to Low K. Sang et al. which describe other types of pump sources. In either embodiment, the pump signals emitted by the pump sources are typically coupled to respective ones of the fiber optic amplifiers, such as by means of a lens system. Additionally, although the pump sources of the illustrated embodiment pump the respective fiber optic amplifiers from one end thereof, the pump sources can be arranged to pump the fiber optic amplifiers from both ends or distributed pump sources can be utilized to pump the fiber optic amplifiers at a plurality of locations spaced along the length thereof.

In addition to the pump source 14, each laser source of this embodiment also generally includes a laser signal source 16 for delivering laser signals to the respective fiber optic amplifier 12. As described above in conjunction with the pump signals, the laser signals provided by a laser signal source can be coupled to a respective fiber optic amplifier, such as by means of a relay lens system. Typically, each laser signal source is a single mode diode laser or the like which provides a high quality, single mode laser signal having a different wavelength than the pump signals. As known to those skilled in the art, the laser signals provided to a respective fiber optic amplifier will be amplified by the pump signals during the propagation of the laser signals through the fiber optic amplifier.

In order to provide increased power amplification, the fiber optic amplifiers 12 of one advantageous embodiment are dual core optical fibers. See U.S. Pat. No. 5,832,163 which issued Nov. 3, 1998 to Jack H. Hollister and is assigned to McDonnell Douglas Corporation and which provides a description of dual core optical fibers and the contents of which are incorporated herein in their entirety. Each dual core optical fiber generally has an inner core doped with one or more rare earth elements, such as ytterbium, neodymium, praseodymium, erbium, holmium or thulium, an outer core surrounding the inner core and a cladding layer surrounding the outer core. As known to those skilled in the art, the outer core of a dual core fiber optic amplifier generally has a predetermined size, shape and numerical aperture. For example, the outer core of a dual core fiber optic amplifier can have a generally rectangular, elliptical or scalloped shape. In order to increase or maximize the efficiency with which the pump signal is coupled to the outer core of a fiber optic amplifier and, thus, the magnitude of the amplification provided by the fiber optic amplifier, the respective pump source 14, can be adapted to emit pump signals having a predetermined size, shape and numerical aperture which is matched to the predetermined cross-sectional size, shape and numerical aperture of the outer core. For example, the pump source can include collimating optics, such as an array of collimating lenses, to controllably shape the pump signals to match the cross-sectional size, shape and numerical aperture of the outer core of the dual core fiber optic amplifier. Thus, the pump source can be mode matched to the respective fiber optic amplifier.

While the laser sources of one advantageous embodiment include fiber optic amplifiers 12 and their associated pump sources 14 and laser signal sources 16 as shown in FIG. 1, the laser sources can include other laser devices which operate incoherently while producing a high quality, single mode signal. For example, the plurality of laser sources can be a plurality of single mode diode lasers 18, which operate incoherently with respect to one another such that the single mode signals emitted by the diode lasers are also incoherent. See FIG. 2.

While the incoherent fiber optic laser system 10 of the present invention can provide a continuous wave output, the incoherent fiber optic laser system can also be designed to provide a pulsed output. For example, the plurality of single mode laser sources can include a plurality of pulsed laser sources, such as a plurality of fiber optic amplifiers 12, which receive laser pulses from respective pulsed laser signal sources 16, such as mode locked lasers. Preferably, the pulsed laser signals are synchronized such that the resulting output of the incoherent fiber optic laser system is a synchronized pulsed output beam. As such, the incoherent fiber optic laser system of this embodiment can produce single mode output pulses having a relatively high power level and pulse rate in order to satisfy the requirements presently contemplated for the next generation of x-ray lithography equipment. For example, the plurality of single mode laser sources can include a 10×10 array of pulsed fiber optic amplifiers operating at three to five millijoules and at a pulse rate of ten kilohertz. However, different types of laser sources operated at different power levels and at different pulse rates can be utilized, if so desired.

Figure 3:
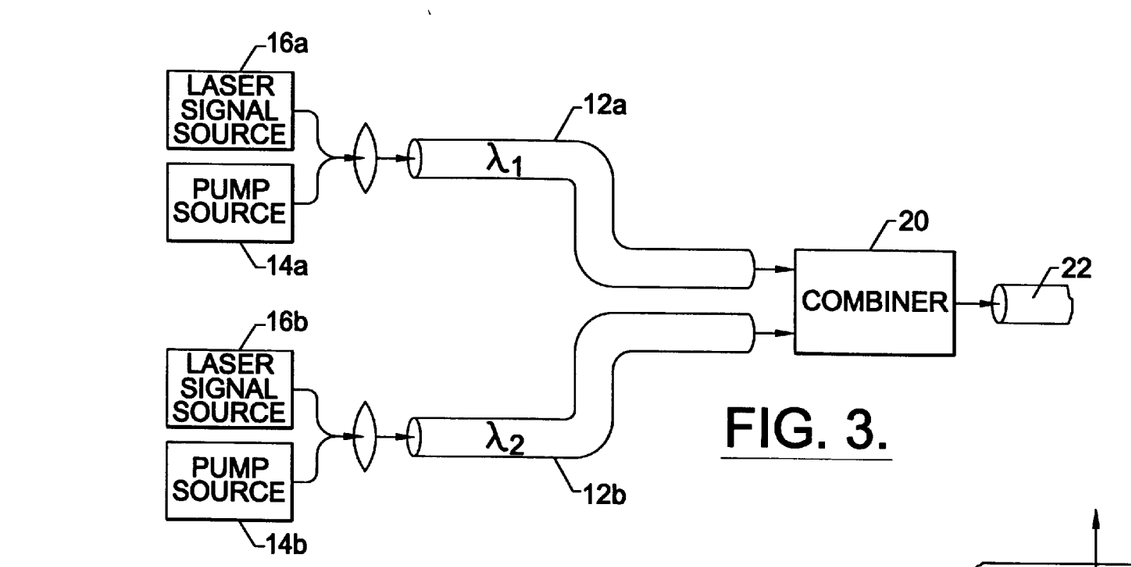
FIG. 3 is a block diagram illustrating a portion of the incoherent fiber optic laser system of one embodiment of the present invention in which the laser signals produced by each of a pair of laser sources are coupled in order to produce a combined laser signal having greater optical power than the laser signals provided by either laser source taken individually.

In order to increase the power level of the laser signals emitted by the laser sources, the plurality of laser sources of one embodiment of the incoherent fiber optic laser system 10 of the present invention include a plurality of pairs of laser sources. For example, each pair of laser sources can include first and second laser sources, such as first and second pump sources 14a, 14b, first and second laser signal sources 16a, 16b, and first and second fiber optic amplifiers 12a, 12b that are coupled to respective ones of the pump sources and laser signal sources. As shown in FIG. 3, the laser sources of this embodiment also include a plurality of couplers 20, such as wavelength division multiplexing (WDM) fiber couplers, dichroic filters, gratings, polarizers or the like. Regardless of the type of coupler, each coupler combines the laser signals provided by respective pair of laser sources into a combined laser signal having a greater power than the laser signals produced by the first or second laser sources taken individually.

In one embodiment depicted in FIG. 3, each laser source can include a pair of single mode fiber optic amplifiers 12 that are pumped by respective pump sources 14. In addition, each fiber optic amplifier is associated with a respective laser signal source 16 that provides laser signals having a respective wavelength. However, the laser source 16a associated with the first fiber optic amplifier 12a generally provides laser signals having a first wavelength $\lambda_1$, while the laser source 16b associated with the second fiber optic amplifier 12b generally provides laser signals having a second wavelength $\lambda_2$ which is different than the first wavelength $\lambda_1$. Following propagation through the respective fiber optic amplifiers, the amplified laser signals having the first and second wavelengths $\lambda_1$ and $\lambda_2$ can be combined by a coupler 20, such as a WDM fiber coupler, in order to produce a combined laser signal having a greater power and brightness than the laser signals provided by either the first or second fiber optic amplifier taken individually. According to the present invention, however, the combined laser signals produced by each pair of fiber optic amplifiers of this embodiment are incoherent with respect to the combined laser signals produced by the other pairs of the fiber optic amplifiers. Even though the laser signals are incoherent, the combined laser signals are still high quality single mode signals.

While the laser signals produced by the first and second fiber optic amplifiers 12a, 12b which have different wavelengths can be spatially combined by WDM fiber couplers, dichroic filters, gratings or the like as described above, the incoherent fiber optic laser system 10 of this embodiment can also include pairs of laser sources which produce signals having the same wavelength, but which differ in other respects, such as by having different polarization states. Depending upon the signal properties which differ between the signals, the laser source may include other types of couplers 20, such as a polarizer for coupling laser signals having different polarization states. In any event, by combining the laser signals provided by the first and second laser sources of a pair of laser sources, the combined laser signal will have increased brightness and a higher power than the laser signals produced by either of the first or second fiber optic amplifiers taken individually.

Figure 2:
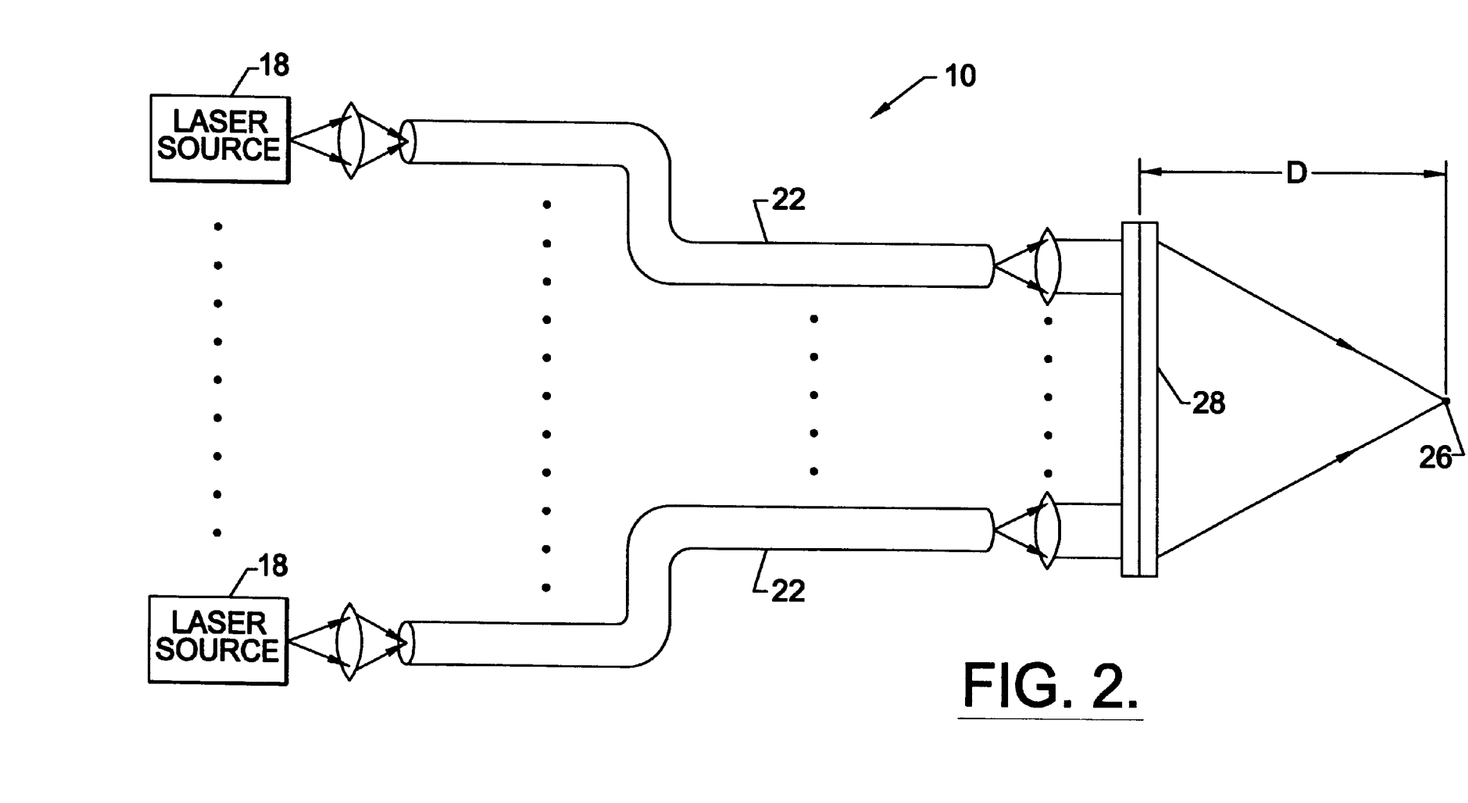
FIG. 2 is a diagram of the incoherent fiber optic laser system of another embodiment of the present invention.

The incoherent fiber optic laser system 10 of the present invention also preferably includes a plurality of single mode optical fibers 22 for receiving the incoherent laser signals emitted by respective ones of the plurality of laser sources. For example, each optical fiber can receive the laser signals emitted by a corresponding one of the laser sources as shown in FIGS. 1 and 2. Alternatively, each optical fiber can receive the combined laser signals emitted by a corresponding pair of laser sources as described above and as illustrated in FIG. 3.

The incoherent fiber optic laser system 10 of the present invention also includes a plurality of lenses 24 for collimating the single mode laser signals provided by respective ones of the single mode optical fibers 22. As shown in FIGS. 1 and 2, the plurality of collimating lenses can include a plurality of graded index (GRIN) lenses, each of which collimates the incoherent, single mode laser signals provided by a corresponding one of the single mode optical fibers. By delivering the laser signals to the collimating lenses with the plurality of optical fibers, the incoherent fiber optic laser system of the present invention permits the laser sources to be spaced apart in any desired fashion. For example, the plurality of laser sources can be widely separated, if so desired, since the optical fibers which deliver the laser signals provided by the plurality of laser sources can then be routed along various paths to the array of collimating lenses without adversely affecting the laser signals propagating or transmitted therethrough. The flexibility in positioning or spacing the laser sources that is afforded by the incoherent fiber optic laser system is further increased in the embodiment in which the laser sources include fiber optic amplifiers 12 since the fiber optic amplifier can also be routed along various paths without adversely affecting the laser signals propagating therealong.

Since the fiber optic laser system 10 of the present invention utilizes incoherent laser sources, each collimating lens 24 preferably has a low far field divergence, such as less than about 100 microradians, although the far field divergence will vary depending upon the requirements of the particular application. Consequently, the net array divergence of the array of collimating lenses will be relatively low. In order to provide a relatively low far field divergence, each collimating lens of one advantageous embodiment has a relatively large diameter, such as a diameter of at least 1 centimeter and, more preferably, a diameter of between 1 centimeter and 10 centimeters. As will be apparent from the following discussion, it is preferable that the collimating lenses have a low far field divergence since the lasers signals collimated by each lens are typically focused to a target location by overlaying each of the collimated laser signals such that the net array divergence of the array of collimating lenses becomes effectively equal to the far field divergence of a single collimating lens. Accordingly, if any of the collimated laser signals had a relatively high divergence, the laser signals could not be definitely focused to the target location.

The incoherent fiber optic laser system 10 also preferably includes means for focusing the collimated, incoherent laser signals to a target location 26 at a predetermined distance D from the focusing means. As shown in FIGS. 1 and 2, the focusing means can include a focusing lens 28 having a predetermined focal length and being at least as large in cross-section as the array of collimating lenses 24. The focusing lens of one embodiment receives the incoherent laser signals following collimation by each of the collimating lenses and focuses those laser signals to the target location in the focal plane of the focusing lens. By properly selecting the focal length of focusing lens, the collimated laser signals can be focused to a location relatively near the focusing lens, such as within a few inches or a few feet, or to a location relatively far from the focusing lens, such as five to ten kilometers from the focusing lens. In either instance, however, the low far field divergence of the collimated laser signals will permit the focusing means to focus the laser signals to a relatively small spot having a relatively high energy density. Thus, the incoherent fiber optic laser system of the present invention can be utilized in a wide variety of applications including those applications requiring the delivery of a laser signal to a relatively near location, such as machining, cutting, drilling, paint stripping and other like industrial applications, and those applications requiring the delivery of laser signal to a more distant location, such as laser weapon and laser ranging systems, sensor countermeasures and other, typically military, applications.

Figure 4:
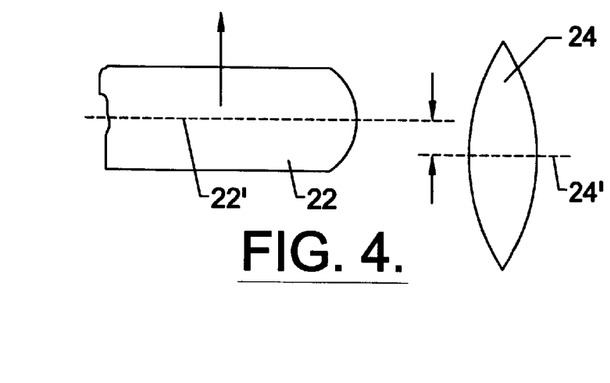
FIG. 4 is a perspective view illustrating the means for laterally positioning an optical fiber with respect to the lens axis of a respective lens in order to appropriately steer or focus the laser signal.

Although a focusing lens 28 can focus the incoherent laser signals following collimation by the collimating lenses 24, the incoherent fiber optic laser system 10 can include other means for focusing the laser signals to the target location 26. As shown in FIG. 4, for example, the means for focusing the laser signals to a target location can include means for laterally positioning the single mode optical fibers 22 with respect to the lens axis 24' of the respective lens. By moving an optical fiber laterally so as to offset the longitudinal axis 22' of the optical fiber from the lens axis defined by the respective collimating lens, the collimated laser signals will be steered in the far field. In this regard, the collimated laser signals will be steered by an angular amount equal to $\Delta q = q \Delta x / d_s$, wherein $\Delta x$ is the lateral displacement of the optical fiber, q is the collimated beam divergence and $d_s$ is the diameter of the fiber mode, such as five to ten microns in most instances. As such, the collimated laser signals can be steered to a common point at the target location in order to produce an output beam having the highest possible intensity. As will be apparent to those skilled in the art, the amount of offset of each optical fiber from the lens axis of the respective lens that is required in order to properly steer the output beam can be determined in an iterative fashion by sequentially dithering the offset of the longitudinal axis of each optical fiber until the intensity of the output beam at the target location is maximized. Although the means for laterally positioning the single mode optical fibers with respect to the lens axis of the respective lens can be utilized in many applications to controllably focus the laser signals, this focusing technique is particularly useful if the atmosphere through which the laser signals will travel is not calm and the individual laser signals are likely to be deflected by turbulence which would tend to spread the power to be delivered by the output beam over a larger area. Although the optical fibers can be positioned relative to the respective collimating lenses in a variety of manners, the optical fibers can be positioned with microactuators as described by U.S. Pat. No. 5,602,955 which issued Feb. 11, 1997 to John M. Haake and is assigned to McDonnell Douglas Corporation, if so desired.

In order to provide an output beam with a shorter wavelength than the wavelength of the laser signals provided by the plurality of laser sources, the incoherent fiber optic laser system 10 can also include a frequency multiplier, such as a frequency doubler. The frequency multiplier would typically be positioned downstream of the focusing means so as to receive the focused laser signals and to produce a corresponding laser signal having a frequency that is a predetermined multiple of the frequency of the laser signals received by the frequency multiplier.

By utilizing incoherent laser signals, the incoherent fiber optic laser system 10 of the present invention provides a focused laser signal having a power density that is essentially the sum of the respective power densities of the laser signals provided by each of the individual laser sources. For example, an incoherent fiber optic laser system having N laser sources that each produce laser signals having a power density P would generate an output beam having a power density of approximately NP. As such, the incoherent fiber optic laser system of the present invention is readily scalable to provide a wide range of output power levels by merely utilizing a different number of laser sources and/or laser sources which emit laser signals having different power levels. Since the output beam provided by the incoherent fiber optic laser system can be scaled so as to provide a wide variety of power levels and can be focused at a target location ranging from a relatively near location to a relatively far location, the incoherent fiber optic laser system of the present invention can be utilized in a wide variety of applications including industrial cutting, machining, welding, drilling, heat treatment, paint stripping as well as laser weapon applications and sensor countermeasures. In addition, the incoherent fiber optic laser system can be utilized to pump other lasers, including both solid state and fiber lasers. While an incoherent output beam is not suitable for all applications, an incoherent output beam such as provided by the incoherent fiber optic laser system of the present invention is extremely advantageous in sensor countermeasure applications in which the plurality of incoherent wavelengths which form the output beam overwhelm the spectrally selective filters that are otherwise used to protect the sensor from illumination by certain wavelengths of light.

Additionally, the fiber optic laser system 10 of the present invention generates an incoherent output beam which can be focused so as to deliver significant power to the target location without requiring the sophisticated optics required to focus or otherwise combine coherent laser signals. However, the output beam generated by the incoherent fiber optic laser system is still of high quality, that is, the output beam exhibits predominantly or entirely fundamental or single mode characteristics.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An incoherent fiber optic laser system comprising:
   a plurality of single mode laser sources for emitting single mode laser signals, said plurality of single mode laser sources operating incoherently with respect to one another such that the single mode laser signals are also incoherent, said plurality of single mode laser sources comprising a plurality of pairs of single mode laser sources, wherein each pair of single mode laser sources comprises first and second single mode laser sources for emitting respective single mode laser signals;
   a plurality of couplers, each coupler adapted to combine the single mode laser signals provided by the first and second single mode laser sources of a respective pair of single mode laser sources;
   a plurality of single mode optical fibers for receiving and transmitting the incoherent, single mode laser signals emitted by respective pairs of said plurality of single mode laser sources and combined by respective ones of said plurality of couplers;
   a plurality of lenses for collimating the incoherent, single mode laser signals provided by respective ones of said single mode optical fibers; and
   means, responsive to said plurality of lenses, for focusing the collimated, incoherent laser signals to a target location at a predetermined distance from said focusing means.

2. An incoherent fiber optic laser system according to claim 1 wherein each pair of single mode laser sources further comprises:
   a pair of pump sources for emitting pump signals; and
   a pair of fiber optic amplifiers for receiving the pump signals from a respective pump source and for emitting single mode laser signals, said pair of fiber optic amplifiers operating incoherently with respect to one another such that the single mode laser signals are also incoherent.

3. An incoherent fiber optic laser system according to claim 1 wherein said plurality of single mode laser sources comprise a plurality of single mode diode lasers.

4. An incoherent fiber optic laser system according to claim 1 wherein said plurality of single mode laser sources comprise a plurality of pulsed laser sources for emitting single mode laser pulses.

5. An incoherent fiber optic laser system according to claim 1 wherein said focusing means comprises a focusing lens.

6. An incoherent fiber optic laser system according to claim 1 wherein each lens defines a lens axis, and wherein said focusing means comprises means for laterally positioning said single mode optical fibers with respect to the lens axis of said respective lens axis.

7. An incoherent fiber optic laser system according to claim 1 wherein each lens has a diameter of at least 1 cm.

8. An incoherent fiber optic laser system according to claim 1 wherein said first single mode laser source of a respective pair of single mode laser sources emits single mode laser signals having different signal properties than the single mode laser signals emitted by said second single mode laser source of the respective pair of single mode laser sources.

9. An incoherent fiber optic laser system according to claim 8 wherein said first single mode laser source of a respective pair of single mode laser sources emits single mode laser signals having a signal property selected from the group consisting of wavelength and polarization that is different than the single mode laser signals emitted by said second single mode laser source of the respective pair of single mode laser sources.

10. An incoherent fiber optic laser system comprising:
    a plurality of single mode laser sources for emitting single mode laser signals, said plurality of single mode laser sources operating incoherently with respect to one another such that the single mode laser signals are also incoherent;
    a plurality of single mode optical fibers for receiving and transmitting the incoherent, single mode laser signals emitted by respective ones of said plurality of single mode laser sources;
    a plurality of lenses for collimating the incoherent laser signals from respective ones of said fiber optic amplifiers, each lens defining a lens axis; and
    means for focusing the collimated, incoherent laser signals to a target location at a predetermined distance from said focusing means, said focusing means comprising means for laterally positioning said optical fibers with respect to the lens axis of a respective lens.

11. An incoherent fiber optic laser system according to claim 9 wherein said plurality of single mode optical fibers comprise a plurality of fiber optic amplifiers.

12. An incoherent fiber optic laser system according to claim 11 further comprising a plurality of pump sources for emitting pump signals that pump respective ones of said fiber optic amplifiers.

13. An incoherent fiber optic laser system according to claim 11 wherein said plurality of fiber optic amplifiers comprise a plurality of pairs of fiber optic amplifiers, wherein each pair of fiber optic amplifiers comprises first and second fiber optic amplifiers, wherein said incoherent fiber optic laser system further comprises a plurality of couplers, and wherein each coupler combines the laser signals provided by the first and second fiber optic amplifiers of a respective pair of fiber optic amplifiers.

14. An incoherent fiber optic laser system according to claim 9 wherein said plurality of single mode laser sources comprise a plurality of pulsed laser sources for emitting laser pulses.

15. An incoherent fiber optic laser system comprising:
- a plurality of fiber optic amplifiers for providing single mode laser signals, said plurality of fiber optic amplifiers operating incoherently with respect to one another such that the single mode laser signals are also incoherent;
- a plurality of pump sources for emitting pump signals that pump respective ones of said fiber optic amplifiers;
- a plurality of single mode optical fibers for receiving and transmitting the incoherent single mode laser signals emitted by respective ones of said plurality of said fiber optic amplifiers; and
- a plurality of lenses for collimating the incoherent single mode laser signals provided by respective ones of said single mode optical fibers.

16. An incoherent fiber optic laser system according to claim 15 wherein said plurality of fiber optic amplifiers comprise a plurality of dual core fiber optic amplifiers.

17. An incoherent fiber optic laser system according to claim 15 wherein said plurality of fiber optic amplifiers comprise a plurality of pairs of fiber optic amplifiers, wherein each pair of fiber optic amplifiers comprises first and second fiber optic amplifiers, wherein said incoherent fiber optic laser system further comprises a plurality of couplers, and wherein each coupler combines the laser signals provided by the first and second fiber optic amplifiers of a respective pair of fiber optic amplifiers.

18. An incoherent fiber optic laser system according to claim 15 wherein said plurality of fiber optic amplifiers comprise a plurality of pulsed fiber optic amplifiers for emitting laser pulses.

19. An incoherent fiber optic laser system according to claim 15 further comprising means, responsive to said plurality of lenses, for focusing the collimated, incoherent laser signals to a target location at a predetermined distance from said focusing means.

20. An incoherent fiber optic laser system according to claim 19 wherein said focusing means comprises a focusing lens.

21. An incoherent fiber optic laser system according to claim 20 wherein each lens defines a lens axis, and wherein said focusing means further comprises means for laterally positioning said optical fibers with respect to the lens axis of said respective lens.

* * * * *

UNITED STATES PATENT AND TRADEMARK OFFICE
CERTIFICATE OF CORRECTION

PATENT NO.   : 6,229,940 B1                                      Page 1 of 1
DATED        : May 8, 2001
INVENTOR(S)  : Rice et al.

It is certified that error appears in the above-identified patent and that said Letters Patent is hereby corrected as shown below:

Title page,
Item [56], References Cited, U.S. PATENT DOCUMENTS,
"1/1999" should read -- 7/1998 --.

Column 10,
Lines 49 and 65, "claim 9" should read -- claim 10 --.

Signed and Sealed this

Thirtieth Day of April, 2002

Attest:

Attesting Officer

JAMES E. ROGAN
*Director of the United States Patent and Trademark Office*